United States Patent
Thomas et al.

(10) Patent No.: US 7,621,561 B2
(45) Date of Patent: Nov. 24, 2009

(54) SIMPLIFIED RESTRAINING TETHER SYSTEM FOR USE WITH A VEHICLE AIR BAG SYSTEM

(75) Inventors: Scott D. Thomas, Novi, MI (US); Nancy C. Evans, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 370 days.

(21) Appl. No.: 11/369,794

(22) Filed: Mar. 7, 2006

(65) Prior Publication Data

US 2007/0210568 A1 Sep. 13, 2007

(51) Int. Cl.
*B60R 21/16* (2006.01)

(52) U.S. Cl. .................................. 280/743.2
(58) Field of Classification Search ............ 280/743.2, 280/730.2
See application file for complete search history.

(56) References Cited

U.S. PATENT DOCUMENTS

| | | | | |
|---|---|---|---|---|
| 5,362,101 A * | 11/1994 | Sugiura et al. | ........... | 280/743.2 |
| 5,489,119 A * | 2/1996 | Prescaro et al. | ......... | 280/743.2 |
| 5,678,858 A * | 10/1997 | Nakayama et al. | ....... | 280/743.2 |
| 5,887,894 A * | 3/1999 | Castagner et al. | ........ | 280/743.2 |
| 6,241,283 B1 * | 6/2001 | Zarazua | ................... | 280/743.2 |
| 6,390,501 B1 | 5/2002 | Greib et al. | .............. | 280/743.2 |
| 6,511,094 B2 | 1/2003 | Thomas et al. | ........... | 280/743.2 |
| 6,561,545 B2 * | 5/2003 | Greib et al. | .............. | 280/743.2 |
| 6,648,371 B2 * | 11/2003 | Vendely et al. | ............. | 280/739 |
| 6,709,008 B2 * | 3/2004 | McGee et al. | ................ | 280/729 |
| 6,749,217 B2 * | 6/2004 | Damian et al. | .............. | 280/734 |
| 6,932,384 B2 * | 8/2005 | Waid et al. | .................... | 280/739 |
| 7,093,854 B2 * | 8/2006 | Fischer et al. | ............ | 280/743.2 |
| 7,192,053 B2 * | 3/2007 | Thomas | ...................... | 280/739 |
| 7,281,734 B2 * | 10/2007 | Abe et al. | .................... | 280/729 |
| 7,354,064 B2 * | 4/2008 | Block et al. | .............. | 280/743.2 |
| 2002/0096871 A1 * | 7/2002 | Pinsenschaum et al. | .. | 280/743.2 |
| 2002/0125706 A1 * | 9/2002 | Greib et al. | .............. | 280/743.2 |
| 2003/0020266 A1 * | 1/2003 | Vendely et al. | ............. | 280/739 |
| 2004/0046376 A1 * | 3/2004 | Ryan | ........................ | 280/743.2 |
| 2004/0090055 A1 * | 5/2004 | Kassman et al. | ......... | 280/743.2 |
| 2005/0023811 A1 * | 2/2005 | Thomas | ...................... | 280/736 |
| 2005/0057027 A1 * | 3/2005 | Fogle et al. | ................. | 280/739 |
| 2005/0057029 A1 * | 3/2005 | Thomas | .................... | 280/743.2 |
| 2005/0127648 A1 | 6/2005 | Fischer et al. | | |
| 2006/0170202 A1 * | 8/2006 | Block et al. | .............. | 280/743.2 |
| 2006/0192370 A1 * | 8/2006 | Abe et al. | .................... | 280/735 |
| 2006/0284404 A1 * | 12/2006 | Green et al. | ............. | 280/743.2 |
| 2007/0045997 A1 * | 3/2007 | Abe et al. | .................... | 280/729 |
| 2007/0132222 A1 * | 6/2007 | Thomas et al. | ........... | 280/743.2 |

* cited by examiner

*Primary Examiner*—Paul N Dickson
*Assistant Examiner*—Karen Jane J Amores

(57) ABSTRACT

An air bag system includes an inflator, an inflatable cushion having an outer face and inflatable upon release of inflation fluid from the inflator, and a restraining tether system. The restraining tether system includes a first tether attached to the outer face of the inflatable cushion, and a second tether attached to the first tether. The first tether is operable to restrain expansion of the inflatable cushion at a first location and a second location spaced from the first location. At least one of the first and second tethers includes a width-reduced portion having a plurality of fabric layers, thereby increasing strength within the restraining tether system.

17 Claims, 6 Drawing Sheets

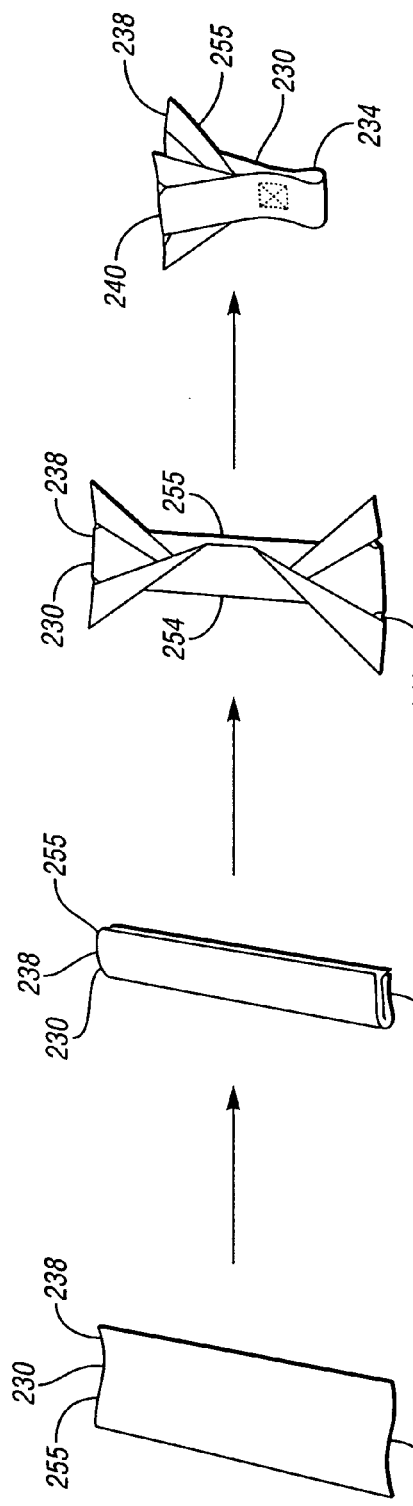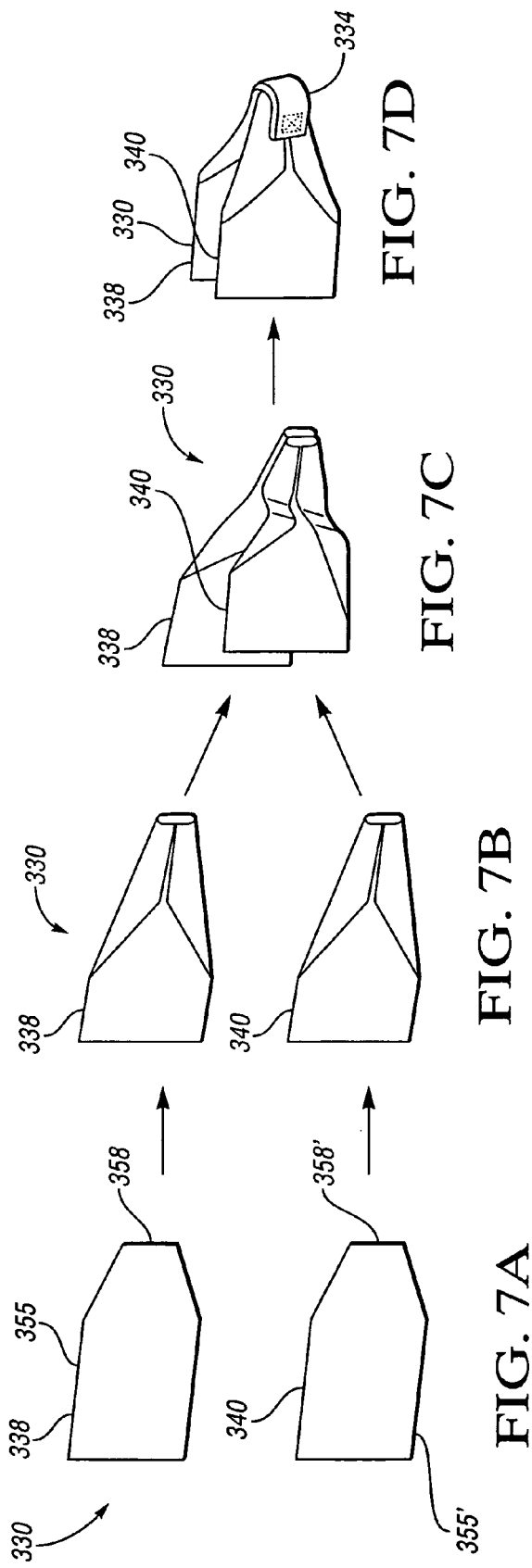

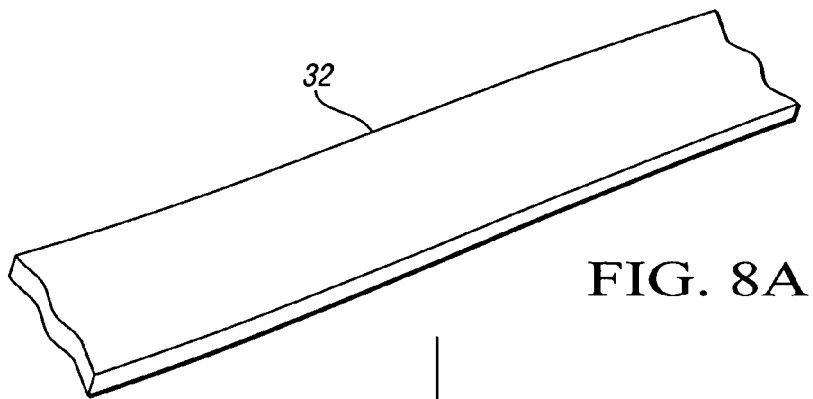
FIG. 8A
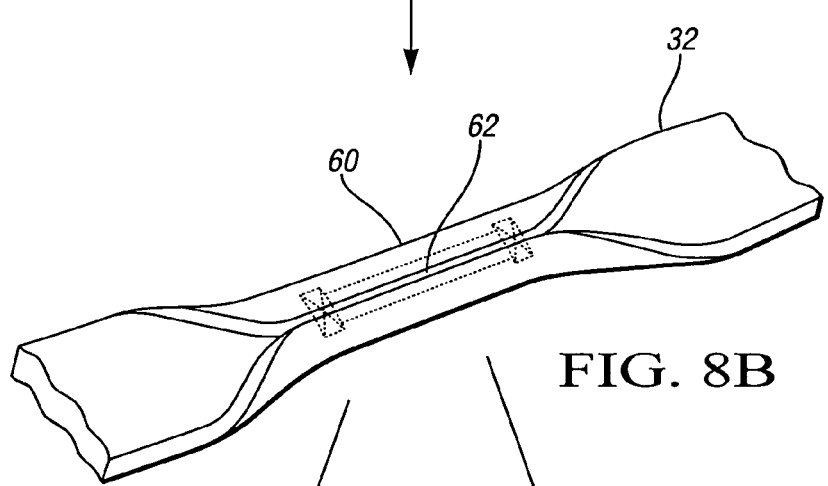
FIG. 8B
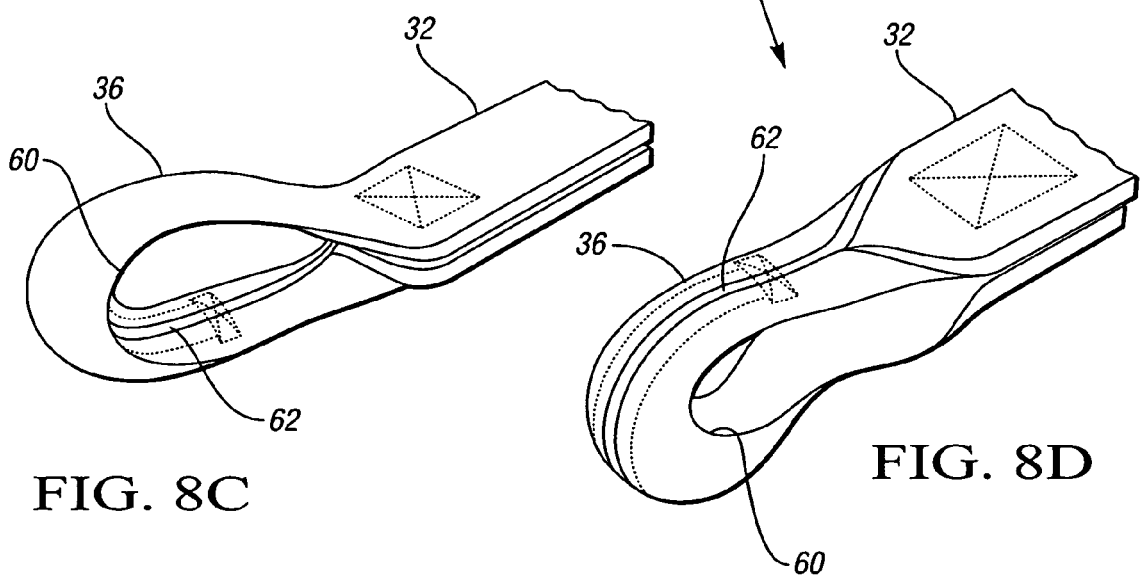
FIG. 8C
FIG. 8D

SIMPLIFIED RESTRAINING TETHER SYSTEM FOR USE WITH A VEHICLE AIR BAG SYSTEM

TECHNICAL FIELD

This invention relates to an automotive vehicle air bag system, and more particularly to an air bag system including a simplified restraining tether system.

BACKGROUND OF THE INVENTION

Air bag systems in automotive vehicles generally include an inflatable cushion designed to deploy within a passenger compartment of the automotive vehicle when triggered by a sensor signal. A tether may be utilized for a variety of reasons within an air bag system. For example, the tether can be used to adjust inflation of the inflatable cushion, such as in what is conventionally referred to as a "dual depth" air bag system.

SUMMARY OF THE INVENTION

The present invention provides an air bag system including an inflator, an inflatable cushion having an outer face and inflatable upon release of inflation fluid from the inflator, and a restraining tether system. The restraining tether system includes a first tether attached to the outer face of the inflatable cushion, and a second tether attached to the first tether. The first tether is operable to restrain expansion of the inflatable cushion at a first location and a second location spaced from the first location. At least one of the first and second tethers includes a width-reduced portion having a plurality of fabric layers, thereby increasing strength within the restraining tether system.

The air bag system may include an anchor member, with the first tether restraining expansion of the inflatable cushion at the first and second locations based on the length of the first and second tethers when the second tether is attached to the anchor member.

The second tether may include an extension tether attached to the inflatable cushion. The second tether may also include an extension loop formed using tear stitching, such that expansion of the inflatable cushion beyond a predetermined depth tears the extension loop, thereby extending the length of the second tether.

The first tether may include a first tether loop, and the second tether may include a second tether loop, with one of the first and second loops extending through the other of the first and second loops to interconnect the first and second tethers. Alternatively, the first tether may include a pair of first tether loops, and the second tether may include a pair of second tether loops, with the first and second pairs of tether loops connecting to one another to interconnect the first and second tethers.

The first tether may further include a first panel attached to the inflatable cushion at the first location, and a second panel attached to the inflatable cushion at the second location. Preferably, a single piece of material defines the first and second panels. The first tether may further include an attachment portion interconnecting the first and second panels. The attachment portion may form at least a portion of the outer panel of the inflatable cushion. The first tether may also include a first tether loop, with the first and second panels each forming at least a portion of the first tether loop. Alternatively, the first tether may include a pair of first tether loops, with the first panel forming at least a portion of one of the pair of first tether loops, and the second panel forming at least a portion of the other pair of first tether loops.

The present invention also provides an air bag system including an inflator, an inflatable cushion having an outer face and inflatable upon release of inflation fluid from the inflator, and a restraining tether system including a first tether attached to the outer face of the inflatable cushion and operable to restrain expansion of the inflatable cushion at a first location and a second location spaced from the first location, with at least a portion of the first tether forming at least a portion of the outer face of the inflatable cushion. The air bag system may further include an anchor member, with the restraining tether system further including a second tether attached to the first tether and removably attached to the anchor member. The first tether would then restrain expansion at the first and second locations based on the length of the first and second tethers when the second tether is attached to the anchor member. Preferably, at least one of the first and second tethers includes a width-reduced portion.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6A is a schematic illustration of a third embodiment of a first tether of the restraining system of FIG. 2;

FIG. 6B is a schematic illustration of the first tether of FIG. 6A folded into an intermediate position;

FIG. 6C is a schematic illustration of the first tether of FIG. 6A folded into a second intermediate position;

FIG. 6D is a schematic illustration of the first tether of FIG. 6A folded into a working position;

FIG. 7A is a schematic illustration of a fourth embodiment of a first tether of the restraining tether system of FIG. 2;

FIG. 7B is a schematic illustration of the first tether of FIG. 7A folded into an intermediate position;

FIG. 7C is a schematic illustration of the first tether of FIG. 7A folded into a working position;

FIG. 7D is a schematic illustration of the first tether of FIG. 7A folded into an alternative working position;

FIG. 8 is a schematic illustration of a first embodiment of a second tether of the restraining tether system of FIG. 2;

DESCRIPTION OF PREFERRED EMBODIMENTS

Figure 1:
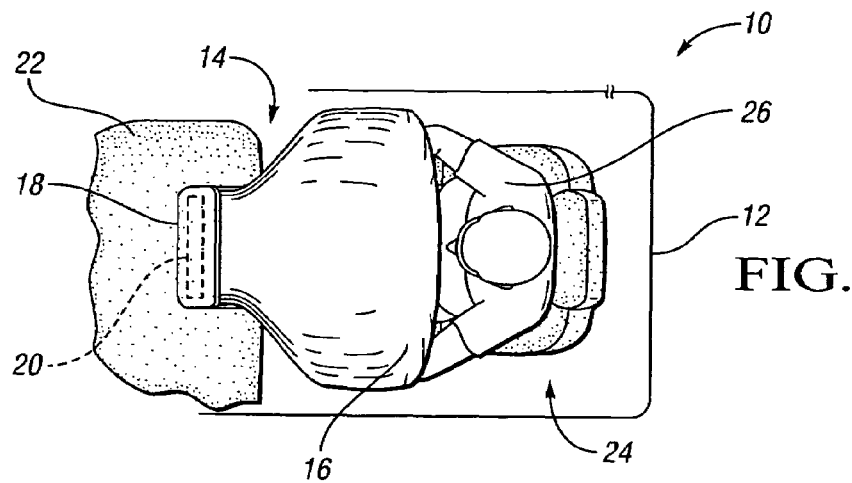
FIG. 1 is a schematic plan view illustration of an air bag system including an inflatable cushion mounted to a vehicle.

Referring to the drawings, wherein like reference numbers refer to like components, FIG. 1 shows a vehicle 10 having a vehicle body 12. Throughout the description of preferred embodiments, directional terms such as forward and rearward or fore and aft are generally defined with respect to the vehicle 10. An air bag system 14 is mounted to the vehicle 10. The air bag system 14 includes an inflatable cushion 16 connected to an air bag housing 18. An inflator 20 is mounted within the housing 18. The housing 18 is shown mounted within an instrument panel 22, although it may be mounted elsewhere on the vehicle 10 within the scope of the invention. The inflatable cushion 16 is selectively deployable into an interior space 24 toward an occupant 26 upon release of inflation gas by the inflator 20. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the inflatable cushion 16.

Figure 2:
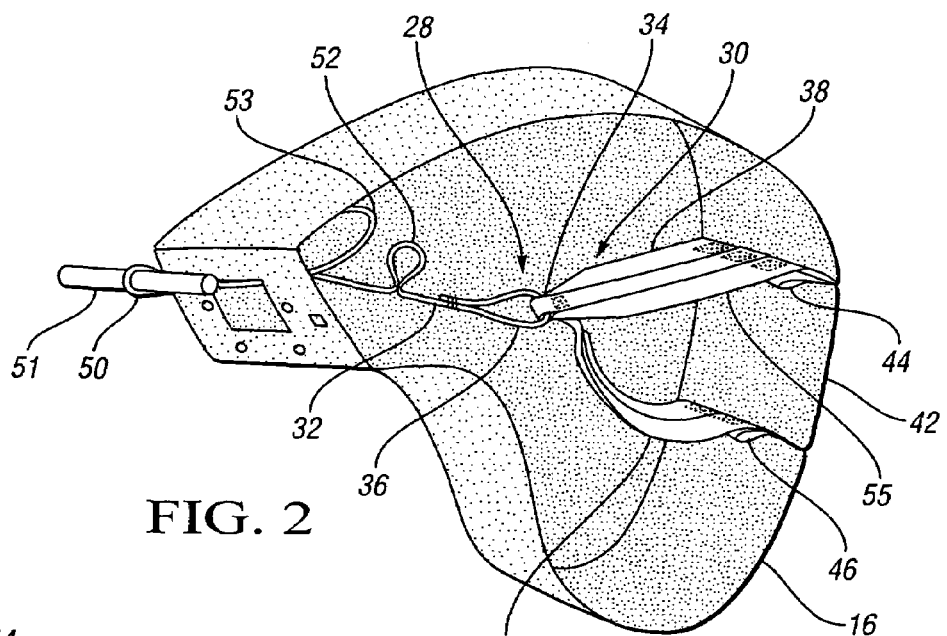
FIG. 2 is a schematic illustration of a first embodiment of a restraining tether system used within an inflatable cushion of the air bag system of FIG. 1.

FIG. 2 shows a first embodiment a restraining tether system 28 within the inflatable cushion 16 of FIG. 1 according to the present invention. The restraining tether system 28 includes a first tether 30 interconnected with a second tether 32. Preferably, the first tether 30 includes a first tether loop 34, and the second tether 32 includes a second tether loop 36 routed through the first tether loop 34 to interconnect the first and second tethers 30, 32. However, the first and second tethers 30, 32 may be connected in another manner within the scope of the present invention. For example, the first and second tethers 30, 32 may be sewn together, either at the first and second tether loops 34, 36 or elsewhere along their length.

Figures 3A, 3B, 3C:
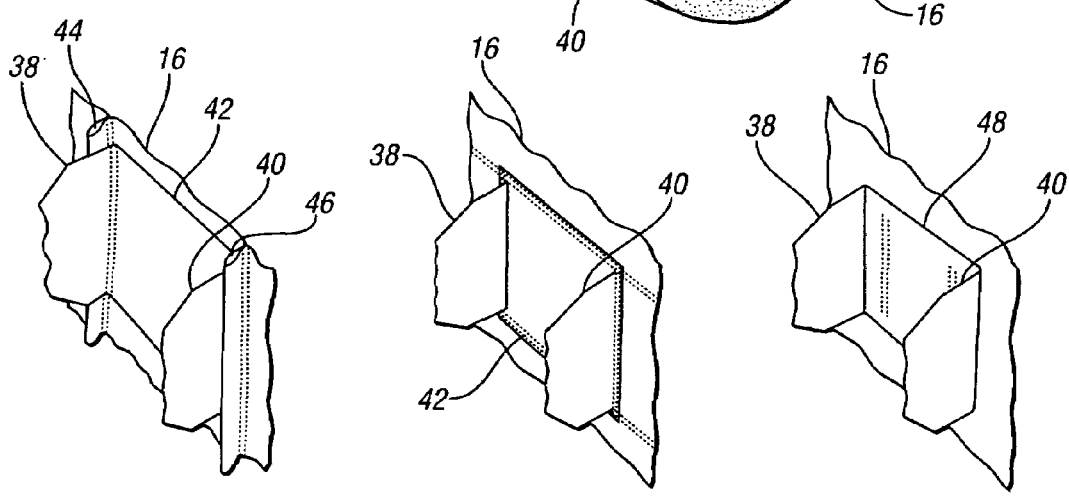
FIG. 3A is a schematic illustration of a first tether of the restraining tether system of FIG. 2 attached to pleats formed within the inflatable cushion.
FIG. 3B is a schematic illustration of the first tether of the restraining tether system of FIG. 2 attached to seams of the inflatable cushion.
FIG. 3C is a schematic illustration of the first tether of the restraining tether system of FIG. 2 including an attachment panel attached to the inflatable cushion.

The first tether 30 is preferably a single fabric member 55 folded to form a first panel 38 and a second panel 40, with the first tether loop 34 disposed therebetween, and attaches to an outer panel 42 of the inflatable cushion 16. Specifically, the first panel 38 attaches to a first pleat 44 defined by the outer panel 42, while the second panel 40 attaches to a second pleat 46 defined by the outer panel 42. However, as shown in FIGS. 3A through 3C, the first tether 30 may attach to the outer panel 42 in a different way within the scope of the invention. FIG. 3A shows a portion of the first panel 38 attached to the first pleat 44, with a portion of the second panel 40 attached to the second pleat 46. FIG. 3B shows the first and second panels 38, 40 attached to the outer panel 42 at seams between various panels, including the outer panel 42, of the inflatable cushion 16. FIG. 3C shows the first and second panels 38, 40 interconnected by an attachment portion 48, with the attachment portion 48 sewn directly to the outer panel 42. As another option, the attachment portion 48 may form the outer panel 42, with other panels of the inflatable cushion 16 attached to the attachment portion 48/outer panel 42.

Note that the first panel 38, the second panel 40, and the attachment portion 48 are preferably all formed from a single piece of material. It should additionally be noted that the first tether 30 may attach to the inflatable cushion 16 with the panels 38, 40 in a horizontally oriented manner, as shown in FIG. 2, or in a vertically oriented manner, as shown in FIGS. 3A through 3C, or in any other direction with respect to the inflatable cushion 16, without changing the inventive concept. While the attachments are shown as being generally linear, the first tether 30 may attach to outer panel 42 in a curved manner or along any other sort of non-linear path as well. It matters only that the first tether 30 attach to the outer panel 42 of the inflatable cushion 16 at at least two locations to practice the present invention. For example, as shown in FIG. 2 and FIG. 3A, the first tether 30 may attach to the outer panel at a first pleat 44 and a second pleat 46. As shown in FIG. 3B, the first tether 30 may attach to the outer panel 42 at a first seam disposed at the junction between the first panel 38 and the outer panel 42, and at a second seam disposed at the junction between the second panel 40 and the outer panel 42. As shown in FIG. 3C, wherein the attachment portion 48 forms at least a portion of the outer panel 42, the first tether 30 attaches to the outer panel 42 at the seams between the attachment portion 48 and the rest of the outer panel 42. Thus it can be seen that the first and second locations may be defined in a number of different ways within the scope of the present invention.

Turning back to FIG. 2, the second tether 32 is removably attachable, preferably at adjustment loop 50, to an anchor member 51 to vary the depth to which the inflatable cushion 16 inflates during deployment. Specifically, since the first tether 30 is attached to the second tether 32, the length of the first and second tethers 30, 32 when fully taut determines how much the first tether 30 pulls on the outer panel 42 of the inflatable cushion 16, if the second tether 32 is attached to the anchor member 51. Thus, the longer the second tether 32, the deeper the depth to which the inflatable cushion 16 may inflate. The anchor member 51 is shown in FIG. 2 as a rod. However, the anchor member 51 can be any portion of the air bag system 14 or the vehicle 10, and may be configured to adjust inflation of the inflatable cushion 16. Mechanisms for adjusting inflation are known in the art, and continue to be improved upon. The anchor member 51, then, is any portion of the air bag system 14 or the vehicle 10 which anchors the second tether 32.

If only two possible depths are desired, only one anchor member 51 need be used. If the second tether 32 is released from the anchor member 51, then the second tether 32 becomes slack, and the first tether 30 no longer constrains inflation of the inflatable cushion 16 by pulling on the outer panel 42 thereof. The air bag system 14 may include a plurality of anchor members 51, with release of the second tether 32 from each successive anchor member 51 lengthening the second tether 32 to a greater degree, thus causing the first tether 30 to provide successively less constraint on the outer panel 42 of the inflatable cushion 16. The second tether 32 may eventually be fully removed from a last anchor member 51 and become slack.

The second tether 32 may also include an extension loop 52, preferably formed using tear stitching. If the inflatable cushion 16 inflates beyond a predetermined depth, the tear stitching will tear and the loop 52 will unfurl, thereby extending the length of the second tether 32. Preferably, an attachment tether 53 attaches between the second tether 32 and the inflatable cushion 16 to attach the second tether 32 to the inflatable cushion 16.

Figure 4A:
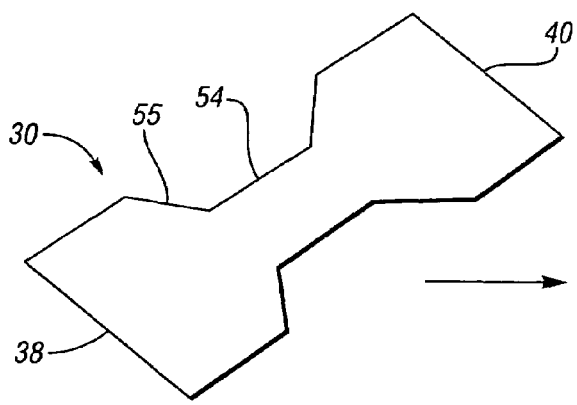
FIG. 4A is a schematic illustration of a first embodiment of a first tether of the restraining tether system of FIG. 2.
Figure 4B:
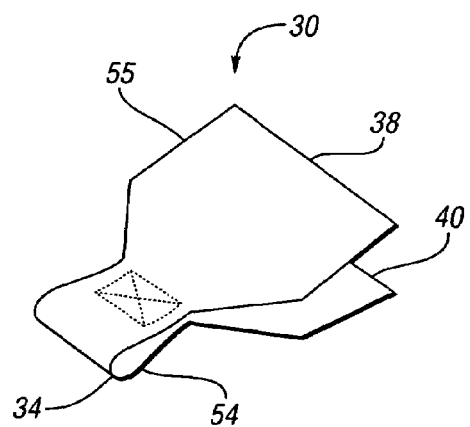
FIG. 4B is a schematic illustration of the first tether of FIG. 4A folded into a working position.

FIGS. 4A and 4B show the first tether 30 in greater detail. Specifically, the single fabric member 55 used to form the first tether 30 is generally hourglass in shape, with a width-reduced portion 54 disposed between the first and second panels 38, 40. The fabric member 55 is folded generally in half at the width-reduced portion 54 into a working position, thereby creating the first tether loop 34. Stitching may be used as indicated to further define and strengthen the first tether loop 34.

Figure 5A:
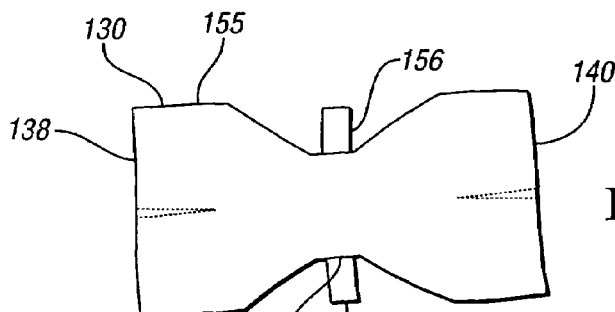
FIG. 5A is a schematic illustration of a second embodiment of a first tether of the restraining system of FIG. 2.
Figure 5B:
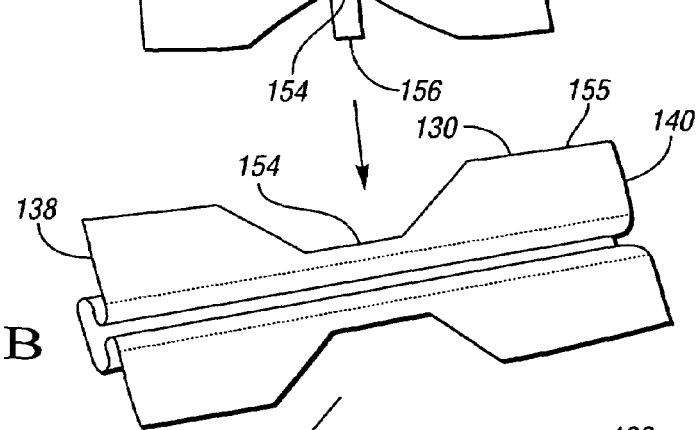
FIG. 5B is a schematic illustration of the first tether of FIG. 5A folded into an intermediate position.
Figure 5C:
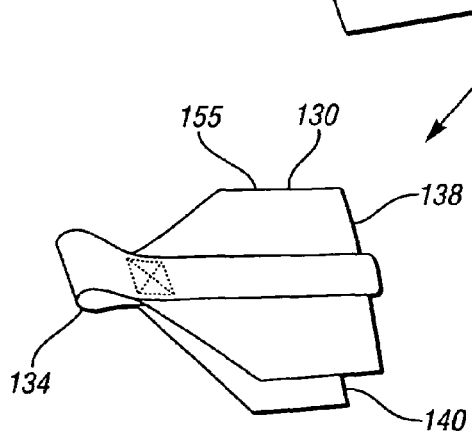
FIG. 5C is a schematic illustration of the first tether of FIG. 5A folded into a working position.
Figure 5D:
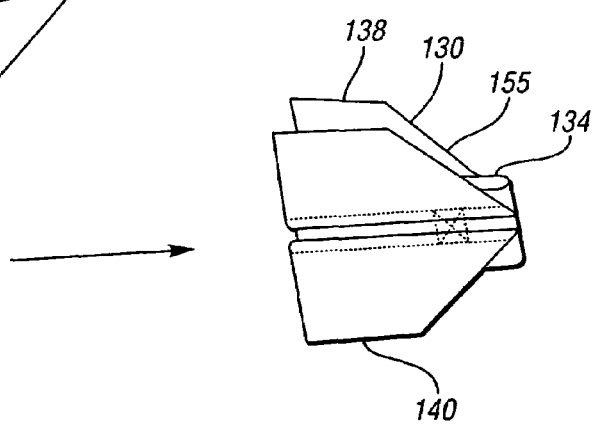
FIG. 5D is a schematic illustration of the first tether of FIG. 5A folded into an alternative working position.

FIGS. 5A through 5D show a second embodiment of a first tether 130, formed from a single fabric member 155 having a generally hourglass shape, as shown in FIG. 5A. Specifically, a width-reduced portion 154 is disposed between first and second panels 138, 140. Tabs 156, shown only in FIG. 5A, may extend from the width-reduced portion 154, or from any other portion of the fabric member 155. The fabric member 155 is first folded to an intermediate position, as shown in FIG. 5B, to reduce the width thereof, and to strengthen the width-reduced portion 154. The tabs 156 may extend around the width-reduced portion 154, or around any portion of the fabric member 155, to further increase strength. Stitching may be utilized to hold the fabric member 155 in the intermediate position, as indicated by dashed lines in FIG. 5B. The fabric member 155 is next folded generally in half at the width-reduced portion 154 into a working position as shown in FIG. 5C, thereby creating a first tether loop 134. Stitching may be used to further define and strengthen the first tether loop 134. The first and second panels 138, 140 may then be folded back again, generally at the width-reduced portion 154, to reach an alternative working position, as shown in FIG. 5D.

FIGS. 6A through 6D show a third embodiment of a first tether 230, formed from a single fabric member 255 having a generally linear shape, as shown in FIG. 6A. The fabric member 255 is first folded generally length-wise into an intermediate position, shown in FIG. 6B, to increase strength. Next, the fabric member 255 is folded into a second intermediate position, shown in FIG. 6C. Specifically, the fabric member 255 is folded to create a width-reduced portion 254 separating first and second panels 238, 240. Finally, the fabric member 255 is folded generally in half at the width-reduced portion 254 to reach a working position as shown in FIG. 6D, thereby creating a first tether loop 234.

FIGS. 7A through 7D show a fourth embodiment of a first tether 330, formed from a pair of fabric members 355, 355'. As shown in FIG. 7A, each of the fabric members 355, 355' include a tapered end 358, 358', although it should be noted that any shape of fabric member can be used. The fabric members 355, 355' are folded at the tapered ends 358, 358' to create width-reduced portions 354, 354', thereby bringing the first tether 330 into an intermediate position, as shown in FIG. 7B. Next, the fabric members 355, 355' are generally aligned, bringing the first tether 330 into a second intermediate position, as shown in FIG. 7C. Finally, the width-reduced portions 354, 354' are folded over and stitching is used to create a first tether loop 334. It can thus be seen that two fabric members 355, 355' can be used to create a first tether 330 according to the present invention. It should also be noted that the technique seen in FIGS. 7C and 7D can be used to create a first tether loop when a single fabric member is used. For example, referring back to FIG. 3C, a first tether loop could be formed by generally aligning and folding the ends of the panels 38, 40.

It should be noted that the cross-section of the fabric members 55, 155, 255, 355 shown herein are not meant to be limiting. That is, a fabric member may be folded in any number of different ways to practice the present invention. It matters only that the folding generally decrease the width of the fabric member while preferably increasing the strength thereof. Furthermore, folding into a working position should preferably create a fabric member having first and second panels separated by a width-reduced portion, with the width-reduced portion preferably including a first loop.

FIGS. 8A through 8D show the second tether 32 of the restraining tether system 28 of FIG. 2 in greater detail, and specifically show creation of the second tether loop 36. To form the second tether loop 36, a portion of the second tether 32 is folded inward into an intermediate position as shown in FIG. 8B, thereby creating a width-reduced portion 60 and a seam 62. Stitching is preferably used to hold the second tether 32 in the intermediate position. The second tether loop 36 is then formed by folding the second tether 32 at the width-reduced portion 60. The second tether 32 may be folded such that the seam 62 is on an interior of the second tether loop 36, as shown in FIG. 8C, or such that the seam 62 is on an exterior of the second tether loop 36, as shown in FIG. 8D. Additionally, the folding described herein can be used to create the adjustment loop 50, the first tether loop 34, or any other loop deemed necessary to practice the present invention.

Figure 9:
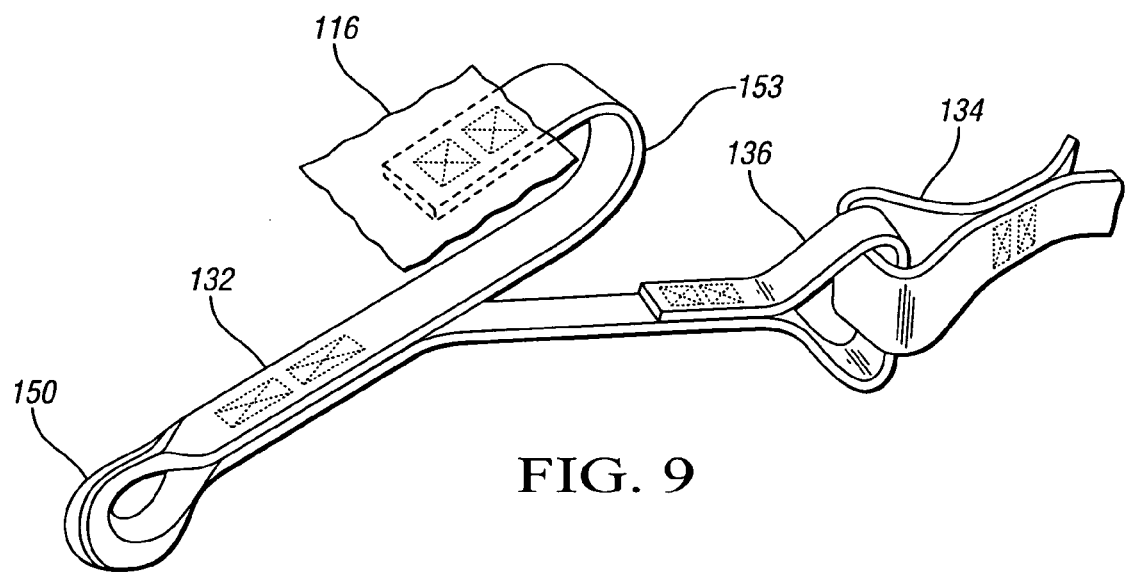
FIG. 9 is a schematic illustration of a second embodiment of a second tether of the restraining tether system of FIG. 2.

FIG. 9 shows a second embodiment of a second tether 132 of the restraining tether system 28 of FIG. 2. A second tether loop 136 is formed by stitching, and attaches to a first tether loop 134 of the first tether 30 of FIG. 2. An attachment tether 153, which in this embodiment is an extension of the second tether 132, attaches to a portion of an inflatable cushion 116. The second tether 132 further includes an adjustment loop 150, also formed by stitching, which removably attaches to the anchor member 51 of FIG. 2. In this embodiment of the second tether 132, all stitching extends through only two layers of fabric. If the second tether 132 is released from the anchor member, the inflatable cushion 16 of FIG. 2 will expand to a deeper depth, as the first tether 30 of FIG. 2 will no longer constrain the inflatable cushion. Alternatively, as discussed previously herein, the second tether 132 may be anchored at more than one anchor member, such that release of the second tether 132 from the first anchor member merely lengthens the second tether 132. The inflatable cushion 116 would thus expand to a deeper depth, with the first tether still constraining inflation to a degree.

Figure 10:
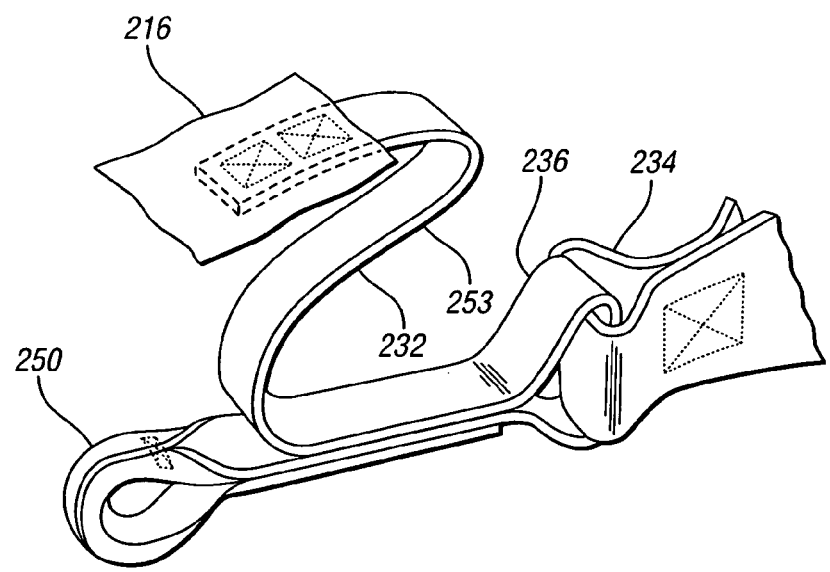
FIG. 10 is a schematic illustration of a third embodiment of a second tether of the restraining tether system of FIG. 2.

FIG. 10 shows a third embodiment of a second tether 232 of the restraining tether system 28 of FIG. 2. A second tether loop 236 is formed by stitching which passes through three layers of the second tether 232. The second tether loop 236 attaches to a first tether loop 234 of the first tether 30 of FIG. 2. An attachment tether 253, which in the embodiment is an extension of the second tether 132, attaches to a portion of an inflatable cushion 216. The same stitching that forms the second tether loop 236 also forms an adjustment loop 250 within the second tether 232, which removably attaches to the anchor member 51 of FIG. 2. It should be noted that stitching need only occur at one location to form both the second tether loop 236 and the adjustment loop 250 in this embodiment, thereby reducing manufacturing costs. When the adjustment loop 250 is released from the air bag housing, the second tether 232 no longer constrains the first tether, thereby allowing inflation of the cushion 216 to a deeper depth.

Figure 11:
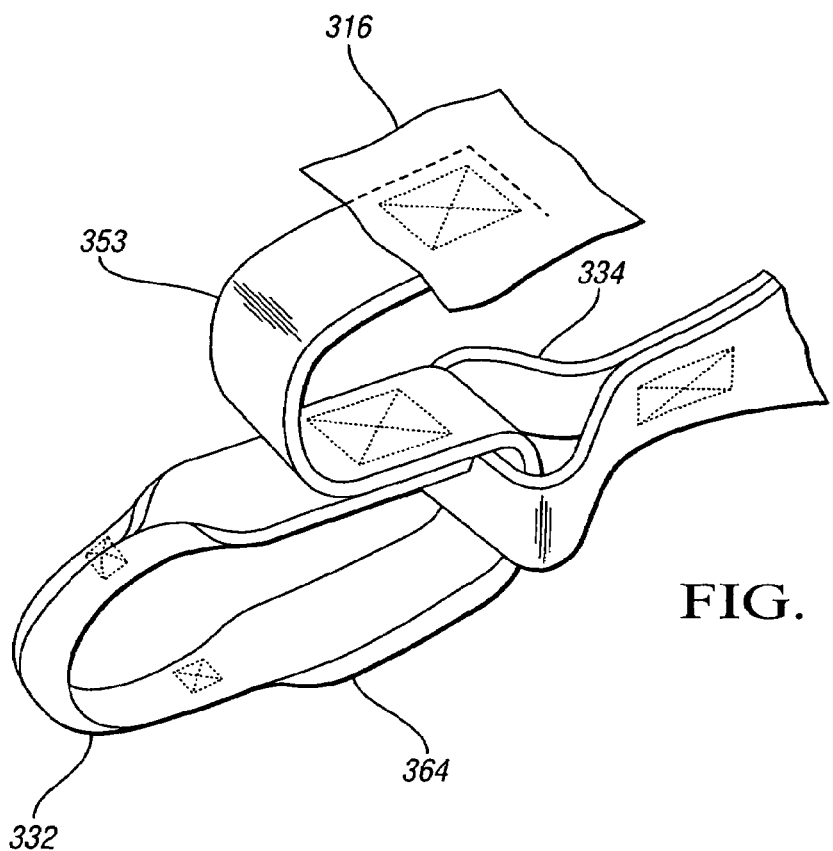
FIG. 11 is a schematic illustration of a fourth embodiment of a second tether of the restraining tether system of FIG. 2.

FIG. 11 shows a fourth embodiment of a second tether 332 of the restraining system 28 of FIG. 2. In this embodiment, the second tether 332 is preferably folded upon itself and stitched to provide additional strength, as described with respect to the first embodiment of the second tether 32 above. An attachment tether 353, which is an extension of the second tether 332, attaches to a portion of an inflatable cushion 316. However, the second tether 332 does not specifically define a second tether loop or an adjustment loop. Instead, a second tether/adjustment loop 364 extends through a first tether loop 334 of the first tether 30 of FIG. 2. Additionally, the second tether/adjustment loop 364 may removably attach to the anchor member 51 of FIG. 2. Alternatively, an additional tether (not shown) may interconnect the second tether 332 with the anchor member to vary deployment of the inflatable cushion 316.

It should be recognized that the second tether loop 36 and the adjustment loop 50 of the second tether 32 of the restraining tether system 28 of FIG. 2 can be formed in a variety of different ways, and that the manner of formation will affect the strength properties of the second tether 28. In general, the more layers of the second tether 32 through which the stitching forming loops 36, 50 extends, the more likely the first and second tethers 30, 32 are to withstand loads placed thereupon during deployment of the inflatable cushion 16. Thus, stitching through more layers likely translates into a stronger second tether 32 given different loading scenarios.

Figure 12:
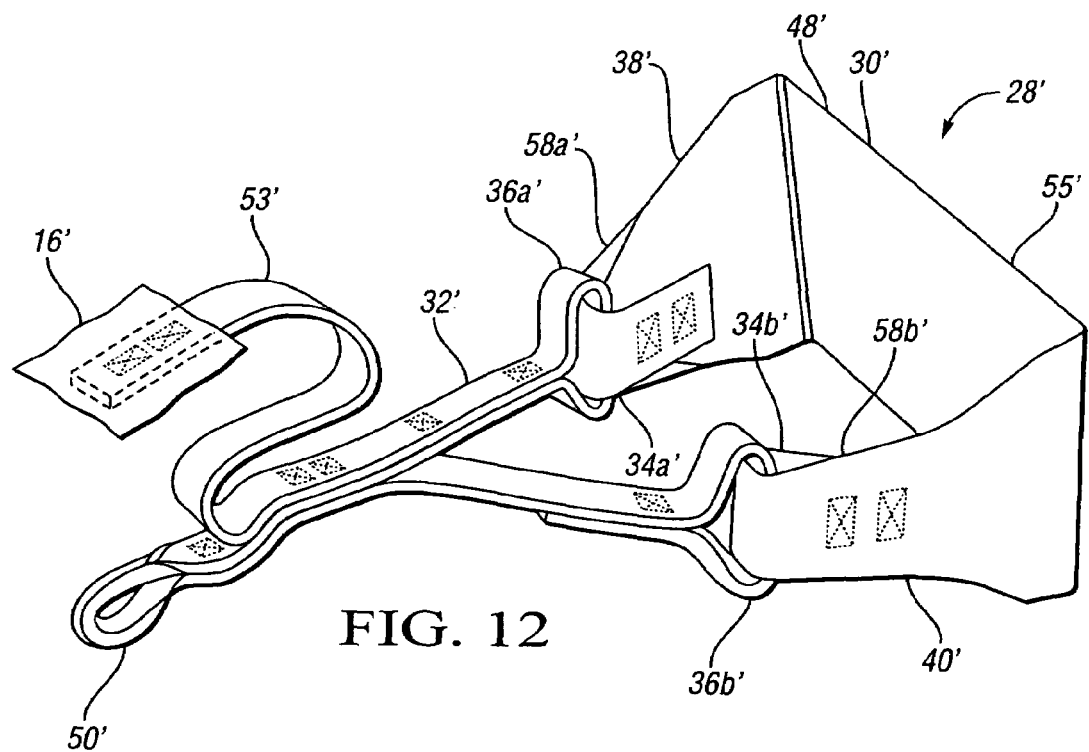
FIG. 12 is a schematic illustration of a second embodiment of a restraining tether system for use with the air bag system of FIG. 1.

FIG. 12 shows a second embodiment of a restraining tether system 28' attached to an inflatable cushion 16' of the air bag system 14 of FIG. 1 according to the present invention. The restraining tether system 28' includes a first tether 30' interconnected with a second tether 32'. Preferably, the first tether 30' includes a pair of first tether loops 34a', 34b', and the second tether 32' includes a pair of second tether loops 36a', 36b', with one of the second tether loops 36a', 36b' routed through one of the first tether loops 34a', 34b' to interconnect the first and second tethers 30', 32'.

The first tether 30' is preferably a single fabric member 55' folded to form first and second panels 38', 40' interconnected by an attachment portion 48'. Each panel 38', 40' includes a preferably tapered end 58a', 58b', with the first tether loops 36a', 36b' formed by folding the tapered ends 58a', 58b'. The tapered ends 58a', 58b' may be folded prior to formation of the loops 36a', 36b' to increase the strength thereof, as shown in FIG. 12. The second tether 32' includes an adjustment loop 50' which is preferably removably attachable to the anchor member 51 of FIG. 2. Preferably, the second tether 32' extends into and attachment tether 53', which attaches to the inflatable cushion 16'.

It can thus be seen that the present invention provides a restraining tether system 28 including a first tether 30 attached to an outer face 52 of an inflatable cushion 16 and operable to restrain inflation thereof. Preferably, the first tether 30 attaches to the inflatable cushion 16 at a plurality of locations to provide ample control during inflation of said inflatable airbag 16. A second tether 32 attaches to the first tether 30, and may be removably attached to an anchor member 51, with the first tether 30 restricting inflation of the inflatable cushion 16 based on the length of the first and second tethers 32.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
    an inflator operable to release inflation fluid;
    an inflatable cushion having an outer face and inflatable upon release of inflation fluid from said inflator;
    a restraining tether system including:
        a first tether attached to said outer face of said inflatable cushion and operable to restrain expansion of said inflatable cushion at a first location and a second location spaced from said first location;
        a second tether attached to said first tether;
        wherein at least one of said first and second tethers includes a width-reduced portion having a plurality of fabric layers, and wherein the other of said first and second tethers is attached with the width-reduced portion to the at least one of said first and second tethers; and
    an anchor member, wherein said second tether removably attaches to said anchor member, and wherein said first tether restrains expansion of said inflatable cushion at said first and second locations based on the length of said first and second tethers when said second tether is attached to said anchor member.

2. The air bag system of claim 1, wherein said second tether includes an extension tether attached to said inflatable cushion.

3. The air bag system of claim 1, wherein said second tether includes an extension loop formed using tear stitching, such that expansion of said inflatable cushion beyond a predetermined depth tears said extension loop, thereby extending the length of said second tether.

4. The air bag system of claim 1, wherein said first tether includes a first tether loop, and wherein said second tether includes a second tether loop, and wherein one of said first and second tether loops extends through the other of said first and second tether loops to interconnect said first and second tethers.

5. The air bag system of claim 1, wherein said first tether includes a pair of first tether loops, and wherein said second tether includes a pair of second tether loops, and wherein one of said pair of first tether loops connects with one of said pair of second tether loops and the other of said pair of first tether loops connects with the other of said pair of second tether loops, thereby interconnecting said first and second tethers.

6. The air bag system of claim 1, wherein said first tether includes a first panel attached to said inflatable cushion at said first location, and a second panel attached to said inflatable cushion at said second location.

7. The air bag system of claim 6, wherein said first tether is a single piece of material defining said first and second panels.

8. The air bag system of claim 6, wherein said first tether further includes an attachment portion interconnecting said first and second panels.

9. The air bag system of claim 8, wherein said attachment portion forms at least a portion of said outer panel of said inflatable cushion.

10. The air bag system of claim 6, wherein said first tether further includes a first tether loop, and wherein said first and second panels each form at least a portion of said first tether loop.

11. The air bag system of claim 6, wherein said first tether further includes a pair of first tether loops, and wherein said first panel forms at least a portion of one of said pair of first tether loops, and said second panel forms at least a portion of the other of said pair of first tether loops.

12. An air bag system comprising:
an inflator operable to release inflation fluid;
an inflatable cushion having an outer face and inflatable upon release of inflation fluid from said inflator;
an anchor member; and
a restraining tether system including:
- a first tether attached to said outer face of said inflatable cushion and operable to variably restrain expansion of said inflatable cushion at a first location and a second location spaced from said first location; and
- a second tether attached to said first tether and removably attached to said anchor member;

wherein said first tether restrains expansion of said inflatable cushion at said first and second locations based on the length of said first and second tethers when said second tether is attached to said anchor member; and wherein at least one of said first and second tethers includes a width-reduced portion having a plurality of fabric layers, thereby increasing strength within said restraining tether system.

13. The air bag system of claim 12, wherein said first tether includes a first tether loop, and wherein said second tether includes a second tether loop, and wherein one of said first and second tether loops extends through the other of said first and second tether loops to connect said first and second tethers.

14. The air bag system of claim 12, wherein said first tether further includes a first panel attached to said inflatable cushion at a first location, and a second panel attached to said inflatable cushion at a second location, said first and second panels at least partially forming said first tether loop.

15. The air bag system of claim 12, wherein said first tether includes said width-reduced portion, said width-reduced portion defining a first tether loop, and wherein said second tether attaches to said first tether at said first tether loop.

16. The air bag system of claim 12, wherein said second tether includes said width-reduced portion, said width-reduced portion defining one of a second tether loop, wherein said first tether attaches to said second tether at said second tether loop, and an adjustment loop, wherein said second tether attaches to said anchor member at said adjustment loop.

17. An air bag system comprising:
an inflator operable to release inflation fluid;
an inflatable cushion having an outer face and inflatable upon release of inflation fluid from said inflator;
a restraining tether system including a first tether attached to said outer face of said inflatable cushion and operable to restrain expansion of said inflatable cushion at a first location and a second location spaced from said first location;

wherein at least a portion of said first tether forms at least a portion of said outer face of said inflatable cushion; and
an anchor member;

wherein said restraining tether system further includes a second tether attached to said first tether and removably attached to said anchor member, said first tether restraining expansion at said first and second locations based on the length of said second first and second tethers when said second tether is attached to said anchor member; and wherein at least one of said first and second tethers includes a width-reduced portion, and wherein the other of said first and second tethers is attached with the width-reduced portion to the at least one of said first and second tethers.

* * * * *